United States Patent [19]

Manley, Jr.

[11] 4,107,958

[45] Aug. 22, 1978

[54] LOCK FOR STACKED MATERIALS

[76] Inventor: Paul P. Manley, Jr., 4560 E. Calle Barril, Tucson, Ariz. 85718

[21] Appl. No.: 710,197

[22] Filed: Jul. 30, 1976

[51] Int. Cl.[2] .......................... E05B 73/00; B65G 1/14

[52] U.S. Cl. .......................................... 70/58; 70/183; 211/8; 214/10.5 R; 248/507

[58] Field of Search ...................... 70/57, 58, 183, 230; 211/8; 214/10.5 R; 269/90; 280/179 R, 179 A; 254/98; 100/219, 289, 290; 248/503, 505, 507, 508; 24/263 A

[56] References Cited

U.S. PATENT DOCUMENTS

| | | | |
|---|---|---|---|
| 405,819 | 6/1889 | Billings | 280/179 A X |
| 467,419 | 1/1892 | Kompst | 248/507 |
| 1,216,054 | 2/1917 | Berger | 211/8 |
| 1,223,786 | 4/1917 | Hammond | 70/230 X |
| 1,313,687 | 8/1919 | Hellweg | 70/230 X |
| 3,443,831 | 5/1969 | Grange | 214/10.5 X |
| 3,504,404 | 4/1970 | Rehnstrom et al. | 280/179 R X |
| 3,752,254 | 8/1973 | Carley et al. | 70/258 X |
| 3,960,301 | 6/1976 | Miller | 280/179 R X |

FOREIGN PATENT DOCUMENTS

| | | | |
|---|---|---|---|
| 626,203 | 2/1936 | Fed. Rep. of Germany | 248/507 |
| 226,015 | 4/1969 | Sweden | 280/179 A |
| 303,488 | 2/1955 | Switzerland | 70/57 |

*Primary Examiner*—Roy D. Frazier
*Assistant Examiner*—Thomas J. Holko

[57] ABSTRACT

A security device for locking or securing building material in a bundle to deter potential thieves is disclosed. The lock includes a pair of clamping elements which are adapted to be positioned at either side of a stack or bundle of material. Each of the clamping elements includes a base plate and an oppositely disposed clamping plate mounted on a shaft. The clamping plate may be vertically moved along the shaft so that the bundle is compressed between the base and clamping plate. Projections or teeth are provided on the base and clamping plate to grip the surface of the upper and lower sheet of material in the bundle. The clamping plate is lockable in any desired position once it is set. The chain or retaining cable may be extended through rings provided on the clamping plate between the oppositely positioned clamping elements to further discourage unauthorized removal of the clamping elements.

7 Claims, 8 Drawing Figures

LOCK FOR STACKED MATERIALS

The present invention relates to a lock and more particularly relates to a lock for securing bundled or stacked building materials together in a clamped position to deter potential thieves.

The theft of building materials from construction sites is a particularly serious problem. Building or construction sites are often left unattended during non-working periods and expensive building materials are often stolen. The expense to the homeowner and contractor goes beyond the replacement cost of the materials. If materials are removed, it is often necessary for the contractor to order new material. During this time, highly skilled labor is unable to work while awaiting replacement materials. This unproductive time substantially adds to the cost of construction.

One solution to the problem is for builders or contractors to hire security guards to guard the construction site during non-working hours. This is extremely expensive and in the case where only limited construction is being undertaken, the use of security guards is not economically feasible. Another approach, is for the contractor to load all removable building materials such as plywood sheeting on a truck at the end of the day and carry the materials back to the construction yard which is normally a fenced or locked area. The impracticalities of such a system are obvious as materials must then be hauled to the job site in the morning requiring substantial handling of the materials.

Although all types of building materials are subject to theft, plywood sheeting such as the sheeting used customarily on roofing is a particular subject of theft. Plywood sheeting of this type generally comes in 4 × 8 sheets and is supplied in bundles of 50 to 60 sheets. Each of these individual sheets weighs in excess of 40 pounds so that while one or two sheets may be manually removed by a potential thief, the manual removal of several sheets bound or bundled together is not easily accomplished. Such theft requires the use of equipment such as a forklift. Therefore, a device which would securely bundle or clamp together multiple sheets of materials such as plywood making the stack heavy and unitary, would effectively serve as a deterrent to most thieves.

In accordance with the foregoing, the present invention provides clamping elements which may be engaged at opposite sides of a stack of building materials. Each of the clamping elements is provided with a base plate which supports an upstanding vertical shaft. A movable clamping plate is vertically positionable a long the shaft by a ratchet on a screw mechanism so that the vertical distance between the base and clamping plates can be adjusted. Opposed surfaces of the base and clamping plates preferably are provided with projections or teeth to grip or engage the underside and topside of the bottom and top sheets, respectively, of a stack of bundled building material. A padlock or resettable combination lock secures the clamping plate in a locked position once the bundle of materials is compressed by the clamping element. A chain or cable may extend across the top of the bundle between the clamping elements to further secure the device in place. With the clamping devices in place, the potential thief must remove the entire stack often weighing hundreds of pounds. The weight of the bundled, locked stack of materials is sufficiently heavy to deter most potential thieves.

The above and other objects and advantages of the present invention will become more apparent from the following specification, claims and drawings in which:

Figure 1:
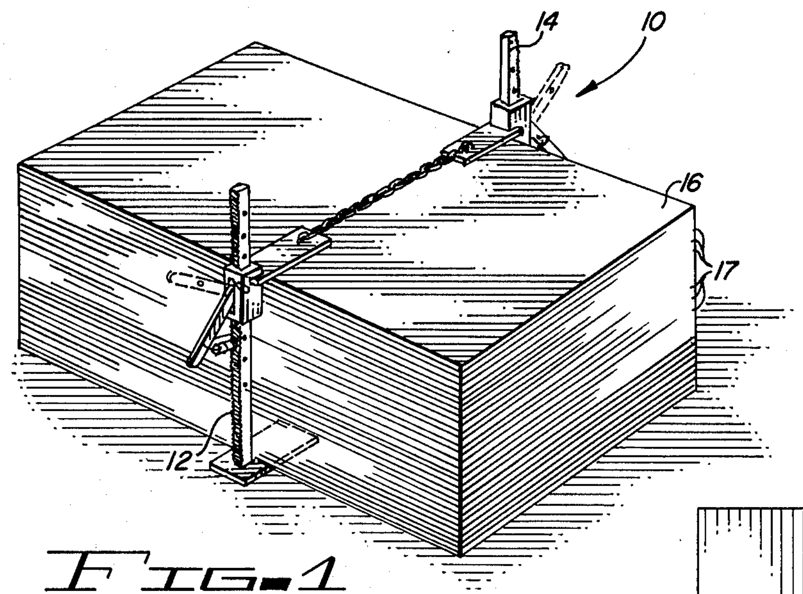
FIG. 1 is a top perspective view of a preferred embodiment of the clamping device of the present invention secured in place about a bundle of sheet building material.
Figure 3:
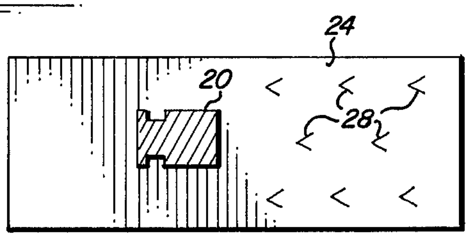
FIG. 3 is a sectional view taken along lines 3—3 of FIG. 2.
Figure 2:
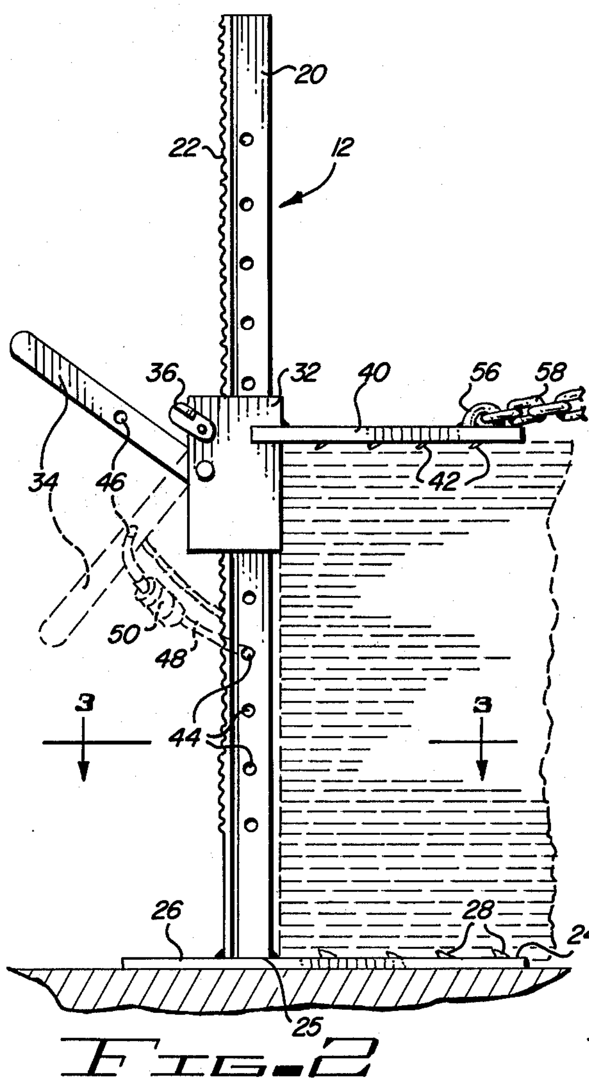
FIG. 2 is a side view showing one of the clamping elements in place with the locked position shown in dotted line.
Figure 4:
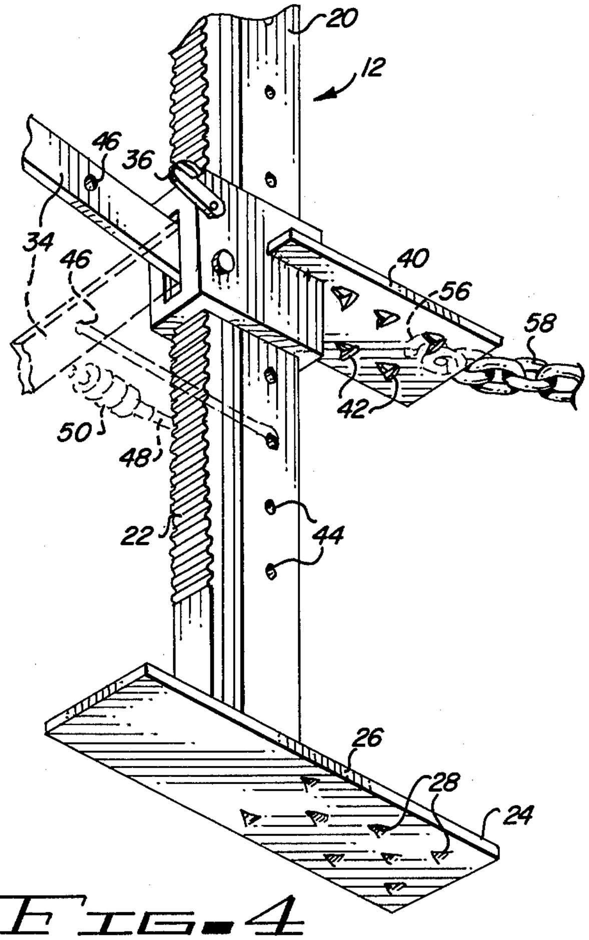
FIG. 4 is a bottom perspective view of one of the clamping elements of the clamping device of the present invention.

Referring now to the drawings, particularly FIGS. 1 to 4, the clamping device of the present invention is generally designated by the numeral 10 and includes opposite clamping elements 12 and 14 secured to a stack or bundle 16 of building materials comprised of individual sheets 17. The bundle 16 may be, for example, a stack of 4 × 8 sheets of plywood or may be other types of building materials such as wallboard, fiberboard, and other similar materials. Each of the individual clamping elements 12 and 14 are substantially identical so a description of one of the elements 12 is deemed sufficient for purposes of disclosure as this description applies equally to the other element 14.

Clamping element 12 has an elongate vertical shaft 20 provided with a longitudinally extending row of teeth 22. Shaft 20 is supported on base 25. Base 25 is in the form of a flat plate having a pedestal plate 26 extending outwardly from the tooth carrying side of the shaft and a base plate 24 which is positionable beneath the stack 16. A series of spaced apart teeth or V-shaped projections 28 extend from the upper surface of plate 24. The purpose of these teeth 28 will be more fully described hereafter.

A housing or carrier 32 is vertically reciprocal along shaft 20 by means of actuating handle 34. A ratchet and power assembly, not shown, is contained within housing 32 in actuating engagement with teeth 22. The ratchet and power assembly is conventional as, for example, it is normally associated with conventional automobile bumper jacks. A latch 36 can be moved to reverse the direction of operation of the ratchet assembly to move the housing 32 in either direction along shaft 20. A clamping plate 40 is affixed, as by welding, to housing 32 and is generally perpendicular to the housing and oppositely disposed from lower base plate 24. The underside of plate 40 carries a plurality of projections 42. A series of longitudinally spaced apart apertures or holes 44 are provided in shaft 20. An opening or aperture 46 is also provided in actuating handle 34 so that a flexible member such as a chain or cable 48 may be extended through the holes 44 and 46 in the shaft and handle, respectively, and secured by means of lock 50 such as a resettable, combination lock. Cable 48 is preferably a case hardened high alloy steel or may be a chain which is case hardened to make it extremely difficult to sever with conventional bolt cutters. Once clamping plate 40 is advanced to a desired position along shaft 20 by means of actuating handle 46, the housing and attached plate 40 may be secured in the locked position by cable and lock assembly 48 and 50.

The upper side of clamping plate 40 may be provided with a heavy ring 56 which may be used to secure a heavy case hardened flexible chain or cable extending between the oppositely positioned clamping elements 12 and 14.

The present invention will be better understood from the following description of use of the device. A stack or bundle 16 of building material normally supplied to contractors containing 50 to 60 sheets is dumped at the job site in a generally stacked condition. If during construction that day, the bundle is depleted by half the remaining 20 or 30 sheets would normally have to either be locked in a secure place or removed from the job site at the end of the work day. With the present invention the elements 12 and 14 are placed opposite longitudinal sides of the bundle. This position is best shown in FIG. 1 with plate 24 beneath the lowermost sheet in the bundle and plate 40 positioned over the uppermost sheet of the bundle. Force may be applied at pedestal plate 26 to urge plate 24 beneath the bundle or stack 16. With the chain and lock removed, pawl 36 is set so that housing 32 is moved downwardly by actuation of handle 34. Handle 34 is actuated until plate 40 tightly engages and compresses the sheet in bundle 16. As this occurs, the projections 28 and 42 on oppositely disposed plates 24 and 40 will grip the surfaces of the outermost sheets. Handle 46 is locked to prevent release by insertion of cable or chain 48 through holes 44 and 46 and locked in place by lock 50. Locking element 14 is similarly engaged opposite locking element 12. Chain 58 may be expended between rings 56 on opposite locking plates 40 and secured in place by a padlock. With the entire bundle compressed and secured in place, the weight of the entire bundle as a unit, assuming approximately 30 sheets of plywood, is in excess of 1,000 pounds. This extreme weight makes it difficult, if not impossible, for the potential thief to remove the building materials without lifting the entire bundle. This cannot be done without the aid of a forklift or other mechanical lifting device which would present an effective deterrent to most thieves. The projections 28 and 42 prevent the locking elements 12 and 14 from being driven or pounded in a horizontal direction to separate the device from the plywood sheets. The interlocking cable or chain 58 also serves to prevent dislodgement of the locking elements from the bundle.

If the bundle of material is a soft or fragile material, it may be necessary to place a bearing material such as a sheet of plywood interposed between plates 28 and 42 and the upper and lowermost sheets in the bundle 16.

Figure 5:
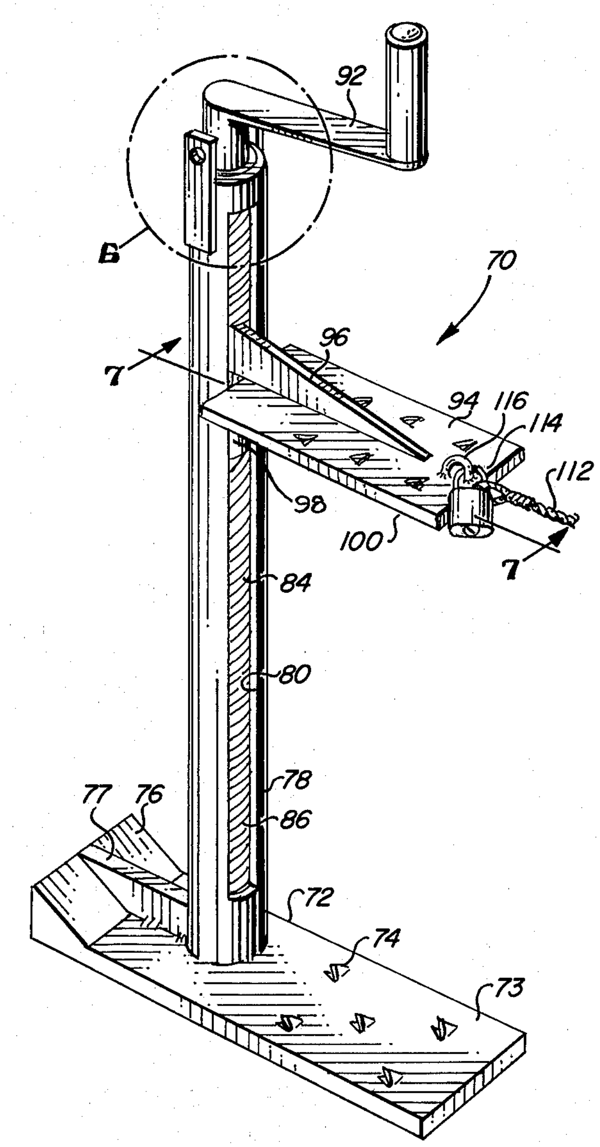
FIG. 5 is a top perspective view of another form of clamping element of the present invention.
Figure 6:
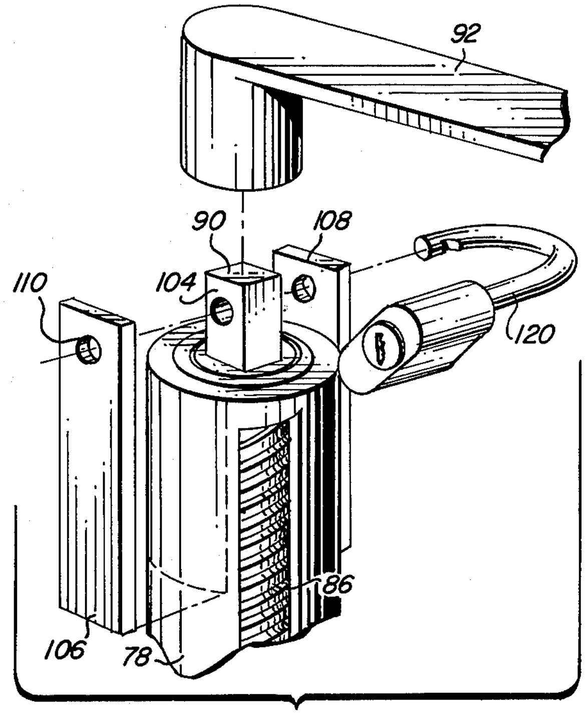
FIG. 6 is an exploded view illustrating the portion of the invention shown encircled in FIG. 5.
Figure 7:
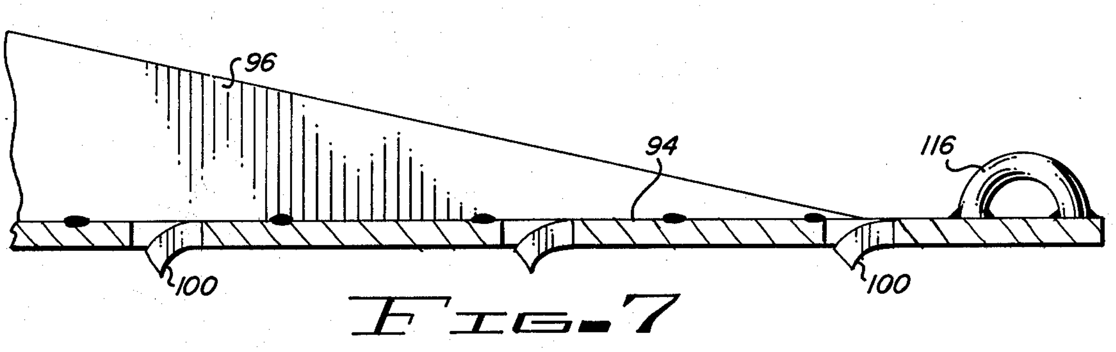
FIG. 7 is a fragmentary side view of the clamping plate used in connection with the embodiment shown in FIG. 5.

FIGS. 5 to 7 illustrate another embodiment of the present invention generally designated by the numeral 70. As has been described with reference to the embodiment shown in FIGS. 1 through 4, the clamping and locking device is provided with a pair of individual clamping elements which are used in oppositely disposed positions at the sides of a bundle of material. Embodiment 70 includes a base 72 having a material engaging base plate 73 with spaced apart upwardly extending projections or teeth 74. An outwardly extending pedestal piece 76 is provided to assist in forcing plate 72 beneath the bundle. A generally cylindrical housing 78 is vertically mounted on plate 72 as by welding. A gusset plate 77 may extend between member 76 and housing member 78 for added strength.

A longitudinally extending slot 80 is provided on the interior side of housing member 78. A rotatable screw shaft 84 is housed within member 78 and is provided with suitable teeth such as helical teeth 86 shown. A lug 90 projects from the upper end of screw shaft 84 so that an appropriate wrench or tool 92 can be engaged about lug 90 to rotate the screw shaft 84.

A clamping plate 94 is reciprocal along longitudinal slot 80. Reciprocation is imparted through gusset plate 96 and member 98 in threaded engagement with screw shaft 84. Rotation of screw shaft 84 will cause clamping plate 94 to reciprocate vertically in either direction within slot 80. The interior side of plate 94 carries appropriate spaced projections or teeth 100.

Lug 90 is provided with a transversely extending aperture 104. Locking plates 106 and 108 are oppositely disposed at the upper ends of housing 78. Apertures 110 in each of the plates 106 and 108 registerably align with aperture 104 in lug 90 when the lug is in the position shown in FIG. 6 so that the hasp of a lock 120 can be extended through the registering aperture to lock the device.

A locking ring 110 is provided on the upper surface of plate 94 so that appropriate cable or chain 112 can be locked, as by means of padlock 114 interconnecting opposite clamping members. It will be obvious that by rotatably actuating wrench 92, screw 86 will be reciprocated which, in turn, causes or imparts vertical motion to plate 94. With a pair of the clamping devices oppositely disposed at the sides of a bundle of plywood, wrench 92 is actuated until the opposite clamping plates 72 and 94 exert a substantial compression against the upper and lower sheets in the stack. The projections 74 and 100 on inner sides of plates 73 and 94, respectively, will grip or engage the outermost sheets. Wrench 92 is turned until aperture 104 in lug 90 registers with apertures 110 in plates 106 and 108. An appropriate locking device such as a padlock 120 is engaged through the registering apertures to lock the device.

Figure 8:
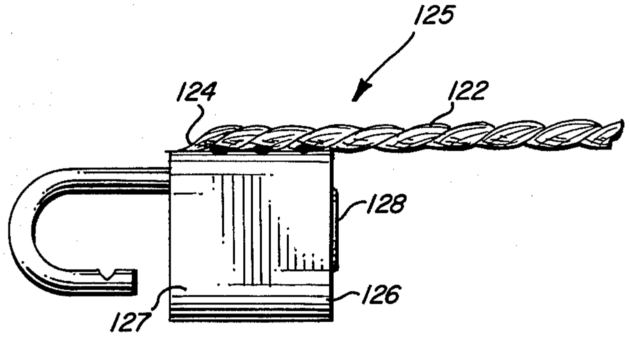
FIG. 8 is a fragmentary view illustrating a cable and attached lock which may be used to interconnect the opposite clamping elements.

FIG. 8 shows another form of flexible member 125 which may be used to interconnect the oppositely disposed clamping devices. A hardened steel cable or chain 122 is welded at 124 to the housing 126. A conventional padlock 127 may be opened at key lock 128.

The embodiment designated by numeral 70 shown in FIGS. 5 to 7 are used in a manner similar to that described with reference to the embodiment previously described and shown in FIGS. 1 to 4. Therefore, it is not deemed necessary to repeat a complete description of operation on this embodiment.

It will be obvious that the present invention provides an effective, convenient and easy to use security device for discouraging theft of building materials. The device can easily be installed at the completion of a work day and quickly disengaged when it is desired to remove materials from the bundle or stack of building materials. The device can be easily and inexpensively fabricated. The device could be purchased by contractors for use on a job site or supplied as a loan item by lumber yards as a sales incentive. In this event a resettable combination type lock may be preferred so that the user can set the lock to any desired combination.

The device can be used with or without the interconnecting chain extending between the oppositely disposed clamping elements as the inclusion of the material engaging projections on the clamping plate will materially prevent the unauthorized dislodgement or forced removal of the clamping devices.

It will be obvious to those skilled in the art to make various changes, alterations and modifications to the device herein chosen for purposes of illustration. To the extent that these changes, alterations and modifications do not depart from the spirit and scope of the appended claims, they are intended to be encompassed therein.

I claim:

1. A security device for deterring theft of stacked articles in sheet form by compressing the articles in a tight stack, said device including:

(a) a relatively flat base plate having a lower surface adapted to rest on a supporting surface, said plate having an upper surface adapted to engage the underside of the lowermost sheet whereby the base can be forced beneath the stacked articles;

(b) an elongate unstanding shaft secured to said base and adpted to extend along a side of the said stack;

(c) a member movable along said shaft including a clamping plate disposed generally opposite said base plate;

(d) engagement means associated with said member and cooperable with said shaft to selectively secure said member and clamping plate in a predetermined position on said shaft whereby said materials are compressed between said base and clamping plate so that individual articles cannot be removed without moving said member; and (e) locking means for locking said engagement means in said predetermined position.

2. The security device of claim 1 wherein said clamping plate and base plate are each provided with projection means for gripping the articles.

3. The security device of claim 1 wherein said base plate includes a pedestal member for urging said base plate beneath the stacked articles.

4. The security device of claim 1 including a pair of said security devices oppositely disposed on opposite sides of a stack of articles and interconnected by a removable member.

5. The security device of claim 1 wherein said locking means are engaged with said shaft and said engagement means.

6. The security device of claim 1, wherein said engagement means includes a ratchet and pawl mechanism and wherein said elongate shaft includes teeth engageable with said ratchet and pawl mechanism.

7. The security device of claim 1, wherein said elongate shaft includes a rotatable screw jack and wherein said member is engageable with said screw jack and reciprocal therealong upon rotation of said screw jack.

* * * * *